(12) United States Patent
Dai

(10) Patent No.: US 8,885,652 B2
(45) Date of Patent: Nov. 11, 2014

(54) HYBRID ORTHOGONAL FREQUENCY DIVISION MULTIPLEXING TIME DOMAIN MULTIPLEXING PASSIVE OPTICAL NETWORK

(75) Inventor: Yuxin Dai, Santa Rosa, CA (US)

(73) Assignee: Futurewei Technologies, Inc., Plano, TX (US)

( * ) Notice: Subject to any disclaimer, the term of this patent is extended or adjusted under 35 U.S.C. 154(b) by 530 days.

(21) Appl. No.: 13/204,286

(22) Filed: Aug. 5, 2011

(65) Prior Publication Data

US 2012/0033972 A1     Feb. 9, 2012

Related U.S. Application Data

(60) Provisional application No. 61/371,408, filed on Aug. 6, 2010.

(51) Int. Cl.
*H04L 12/28*     (2006.01)

(52) U.S. Cl.
USPC .............................. 370/395.5; 398/46; 398/74

(58) Field of Classification Search
None
See application file for complete search history.

(56) References Cited

U.S. PATENT DOCUMENTS

| 7,627,246 | B2 * | 12/2009 | Sorin et al. ................ 398/63 |
| 2005/0152697 | A1 | 7/2005 | Lee et al. |
| 2007/0019956 | A1 * | 1/2007 | Sorin et al. ................ 398/71 |
| 2007/0195823 | A1 | 8/2007 | Biegert |
| 2008/0131124 | A1 * | 6/2008 | Nam et al. ................ 398/67 |
| 2008/0310842 | A1 | 12/2008 | Skrobko |
| 2009/0060530 | A1 | 3/2009 | Biegert et al. |
| 2009/0092394 | A1 | 4/2009 | Wei et al. |
| 2010/0150556 | A1 | 6/2010 | Soto et al. |
| 2010/0214651 | A1 * | 8/2010 | Kim et al. ................ 359/344 |
| 2010/0254271 | A1 | 10/2010 | Ansari et al. |
| 2010/0310025 | A1 | 12/2010 | Morimoto et al. |
| 2011/0058813 | A1 * | 3/2011 | Boyd et al. ................ 398/68 |
| 2011/0116796 | A1 * | 5/2011 | Zheng ................ 398/45 |
| 2011/0135306 | A1 * | 6/2011 | Kim et al. ................ 398/68 |
| 2011/0182428 | A1 * | 7/2011 | Zhao et al. ................ 380/256 |

FOREIGN PATENT DOCUMENTS

| CN | 101137134 A | 3/2008 |
| CN | 101479978 A | 7/2009 |
| WO | 2011031831 A1 | 3/2011 |

OTHER PUBLICATIONS

Foreign Communication From A Counterpart Application, European Application. 11814130.8, Extended European Search Report dated Sep. 12, 2013, 9 pages.
Foreign Communication From A Counterpart Application, PCT Application No. PCT/CN2011/078096, Written Opinion dated Nov. 17, 2011, 4 pages.
Foreign Communication From A Related Counterpart Application, International Application No. PCT/CN2011/078096, International Search Report dated Nov. 17, 2011, 4 pages.

* cited by examiner

*Primary Examiner* — Phirin Sam
(74) *Attorney, Agent, or Firm* — Conley Rose, P.C.; Grant Rodolph; Jonathan K. Polk

(57) ABSTRACT

An apparatus comprising a time domain multiplexing (TDM) to Orthogonal Frequency Division Multiplexing (OFDM) or bounded Quadrature Amplitude Modulation (QAM) channels HOT PON converter configured to couple to an optical line terminal (OLT) via an optical fiber and to a plurality of network terminals (NTs) via a point-to-multipoint coaxial cable and configured to transmit TDM data from the OLT using OFDM or bounded QAM channels to the corresponding NTs, wherein the OFDM or bounded QAM channels transmission of TDM data maintains End-to-End (E2E) TDM passive optical network (PON) protocols, service provisioning, and quality of service (QoS).

20 Claims, 10 Drawing Sheets

HYBRID ORTHOGONAL FREQUENCY DIVISION MULTIPLEXING TIME DOMAIN MULTIPLEXING PASSIVE OPTICAL NETWORK

CROSS-REFERENCE TO RELATED APPLICATIONS

The present application claims priority to U.S. Provisional Patent Application 61/371,408, filed Aug. 6, 2010 by Yuxin Dai, and entitled "Hybrid Orthogonal Frequency Division Multiplexing Time Domain Multiplexing Passive Optical Network," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Coaxial cable plants have been widely deployed worldwide, e.g., in the past two to three decades. Although Time Domain Multiplexing (TDM) Passive Optical Networks (PONs) based Fiber-to-the-home (FTTH) architecture are emerging, due to the relatively high cost of such systems, coaxial cable plants are still serving many broadband triple play customers today. The coaxial cable has about 5 Gigabit per second (Gbps) digital bandwidth, which is typically sufficient for broadband access demand. One problem of traditional cable access is that it may not have a satisfactory data access scheme that is sufficient for current or future users demand. For example, a data over cable service interface specification (DOCSIS) standard is used to provide data access in North America and Europe. The DOCSIS standard has an upstream data rate that is limited to about 100 Megabit per second (Mbps), such as in the case of DOCSIS 3.0 with channel bonding which is shared by many (e.g. from about 100 to about 500) cable modems. Due to historic reasons, e.g., to support legacy systems and/or save investment cost in new infrastructure, DOCSIS may still be used as a cable data access scheme in these regions in the foreseeable future. A TDM PON can provide much higher data rates than coaxial cable systems. For example an Ethernet PON (EPON) can provide about 1 Gbps upstream and downstream symmetric bandwidth to about 32 shared customers, and a GPON can support 2.5 Gbps downstream and 1.25 Gbps upstream bandwidth to about 32 shared customers. Thus, the TDM PON is a more attractive data access method for non-DOCSIS regions, such as Asia and China.

SUMMARY

In one embodiment, the disclosure includes an apparatus comprising a TDM to Orthogonal Frequency Division Multiplexing (OFDM) or bounded Quadrature Amplitude Modulation (QAM) channels HOT PON converter configured to couple to an optical line terminal (OLT) via an optical fiber and to a plurality of network terminals (NTs) via a point-to-multipoint coaxial cable and configured to transmit TDM data from the OLT using OFDM or bounded QAM channels to the corresponding NTs, wherein the OFDM or bounded QAM channels transmission of TDM data maintains End-to-End (E2E) TDM passive optical network (PON) protocols, service provisioning, and quality of service (QoS).

In another embodiment, the disclosure includes a network component comprising a receiver configured to receive TDM PON downstream data from an OLT and receive OFDM or bounded QAM upstream data from a plurality of NTs, a converter configured to remove TDM PON line coding and to encapsulate and convert the TDM PON downstream frames to OFDM or bounded QAMs downstream data and encapsulate and convert the OFDM or bounded QAMs upstream data to TDM PON upstream frames, and a radio frequency (RF) transmitter configured to send the OFDM or bounded QAMs downstream data to the corresponding NTs and an optical transmitter to send the TDM PON upstream data to the OLT.

In yet another embodiment, the disclosure includes a network apparatus implemented method comprising receiving a TDM optical signal from an OLT, processing with a processor the TDM optical signal to remove TDM PON line code and to extract TDM data in a TDM PON frame, processing with a processor to encapsulate TDM PON frame using OFDM or bounded QAM, and sending the OFDM or bounded QAM processed TDM PON frame to a plurality of NTs via a coaxial cable.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Although TDM PON is considered a more advanced fiber access technology, coaxial cables are still widely used for last mile broadband access. The coaxial cable has substantially higher bandwidth than twist pair wires and has been widely deployed during the past two or three decades. Due to the relatively high cost of FTTH, fully utilizing the bandwidth of existing coaxial cable plants in conjunction with TDM PON technologies may be an economic way to meet the bandwidth demand today.

Extending at least some of the TDM PON services to existing coaxial cable plants may be desirable to obtain some of the advantages of TDM PON systems while maintaining at least some of the coaxial cable plant infrastructure. However, extending the TDM PON services to the coaxial cable plants may also be challenging.

Disclosed herein is a system and method for establishing a Hybrid OFDM TDM PON. The Hybrid OFDM TDM PON may extend the TDM PON protocols (e.g., for an EPON, Gigabit PON (GPON), or other PON types) to coaxial cables with relatively wideband OFDM technology or bounded QAM channels. As such, the TDM PON protocols, provisioning, QoS, and services may be seamlessly extended to the coaxial cable plants. The Hybrid OFDM TD PON may also provide a smooth migration path to FTTH in the future. The Hybrid OFDM TDM PON may also be referred to herein as a HOT PON.

Figure 1:
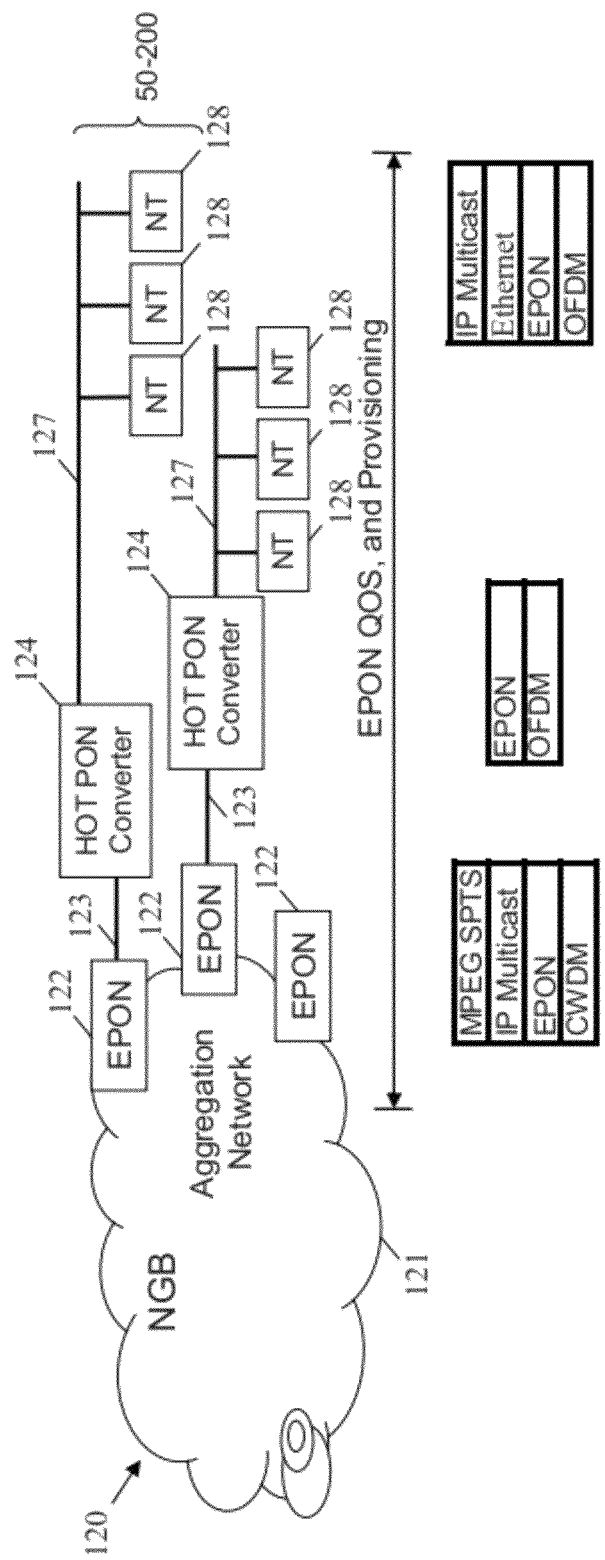
FIG. 1 is a schematic diagram of embodiments a TDM PON (EPON and/or GPON) based HOT PON.

FIG. 1 illustrates embodiments of a TDM PON (EPON and/or GPON) based HOT PON 120. The HOT PON 120 may comprise a NGB aggregation network 121, a plurality of EPON OLTs 122, a plurality of HOT PON converter units 124, and a plurality of network terminals (NTs) 128. The EPON OLTs 122 may be coupled, e.g., at the edge, to the NGB aggregation network 121 and each EPON OLT 122 may be coupled to a corresponding HOT PON O/E unit 124 via an optical fiber 123. Each HOT PON O/E unit 124 may be coupled to a plurality of NTs 128 via a coaxial cable plant 127. The components of the HOT PON 120 may be arranged as shown in FIG. 1.

The HOT PON converter units 124 may be configured to extend EPON QoS and provisioning of the EPON over the coaxial cable plant 127 to the customer end, e.g., the NTs 128. The HOT PON converter units 124 may implement an OFDM scheme or bounded QAM channels to extend TDM protocols and allow E2E QoS and provisioning from the EPON OLTs 122 to the NTs 128 and associated customers. The OFDM or bounded QAM scheme may be transparent to the PON protocol and is described in more detail below. The NTs 128 may be customer equipment configured to receive customer data, services, and/or system control data, from the corresponding HOT PON O/E units 124 via the coaxial cable plant 127 in electrical signal form. The NTs 128 may demodulate or process the received electrical signals to provide the data/services to the customers or end-users that are associated with the NTs 128. The NTs 128 may also modulate and send data in the form of electrical signals from the customers (e.g., customer communication devices) to the HOT PON converter units 124 via the coaxial cable plant 127.

In an embodiment, the data sent from EPON OLTs 122 may comprise Moving Picture Experts Group (MPEG) Single Program Transport Stream (SPTS), IP multicast, EPON control data or frames. The EPON frames may be processed based at the HOT PON converter units 124. The data forwarded to the NTs 128 may comprise IP multicast, Ethernet, EPON control, and/or OFDM data or frames. The HOT PON 120 in FIG. 1 is an EPON based HOT PON, however similar architectures may be used for other types of TDM PONs such as a GPON based HOT PON, as described further below.

Figure 2:
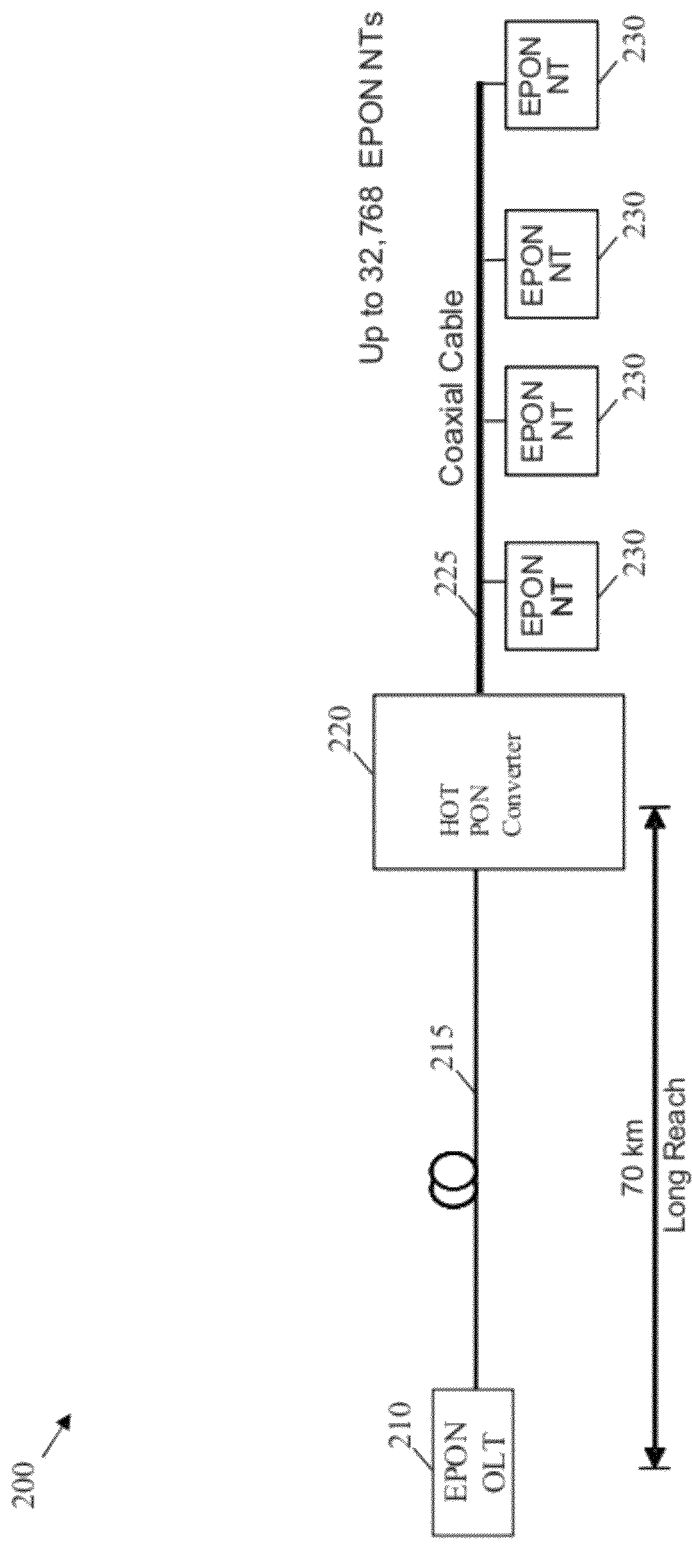
FIG. 2 is a schematic diagram of another embodiment of an EPON based HOT PON.

FIG. 2 illustrates an embodiment of another EPON based HOT PON 200. The EPON HOT PON 200 may comprise an EPON OLT 210, a HOT PON converter 220, and a plurality of EPON NTs 230. The EPON OLT 210 may be coupled to the HOT PON converter 220 via a single fiber 215. There is no optical splitter between the EPON OLT 128 and the HOT PON converter 220. The HOT PON converter 220 may be coupled to the HOT PON NTs 230 via a point-to multiple point coaxial cable 225. The components of the EPON HOT PON 200 may be configured similar to the corresponding components of the HOT PON 120. The EPON HOT PON 200 may support up to about 32,768 logical EPON NTs 230.

The EPON OLT 210 transmits data using the EPON protocol. The EPON OLT 210 may be located at a central office. The HOT PON converter 220 may convert EPON frames to the frequency domain that are transmitted in electrical (e.g., RF) signals over the coaxial cable 225. The HOT PON converter 220 may encapsulate TDM PON Media Access Control (MAC) frames that are transmitted using electrical signals over the coaxial cable 225. In the OFDM or bounded QAM scheme, different HOT PON NTs 230 may share frequency bands, but may not require time scheduling at the HOT PON converter 220. The OFDM scheme or bounded QAM may be transparent to the TDM protocol at the EPON OLT 210 that may not be aware of the OFDM or bounded QAM scheme at the HOT PON converter 220. The HOT PON converter 220 may be located in the field away from the EPON OLT 210.

The fiber 215 between the EPON OLT 210 and the HOT PON converter 220 may not comprise any splitters and hence the fiber 215 may reach a longer distance than a standard 20 kilometers (km) PON distance. For example, the fiber 215 may carry the TDM PON signals a distance equal to about 70 km or more from the EPON OLT 210 to the HOT PON converter 220. The HOT PON NTs 230 may then receive the RF signals that comprise the TDM PON MAC frames and services. The HOT PON NTs 230 may be EPON ONTs with optical transceivers replaced by electrical transceivers that are equipped with OFDM or QAM demodulators.

Figure 3:
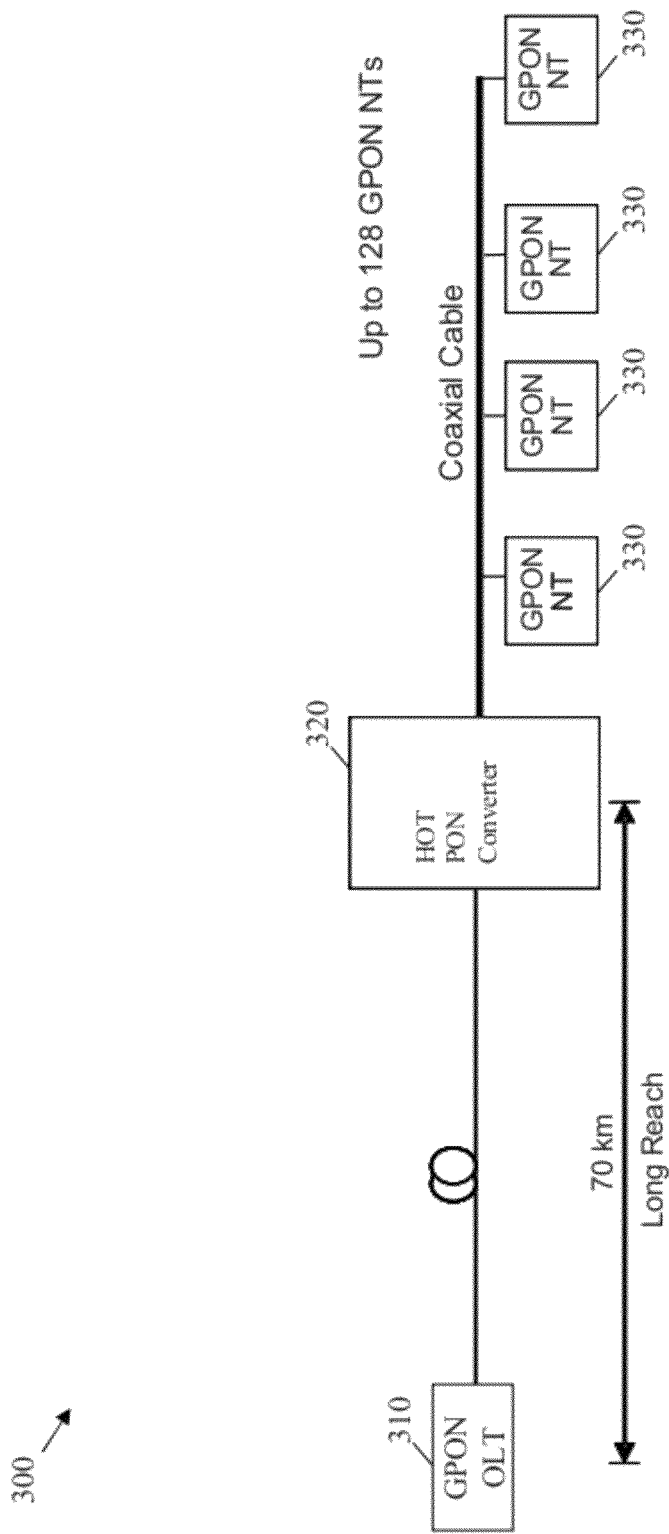
FIG. 3 is a schematic diagram of an embodiment of a Gigabit PON (GPON) based HOT PON.

FIG. 3 illustrates an embodiment of a GPON based HOT PON 300. The GPON HOT PON 300 may comprise a GPON OLT 310, a HOT PON converter 320, and a plurality of HOT PON NTs 330. The GPON OLT 310 may be coupled to the HOT PON converter 320 via a single point-to-point fiber 315. The HOT PON converter 320 may be coupled to the HOT PON NTs 330 via a coaxial cable 325. The components of the GPON HOT PON 300 may be configured similar to the corresponding components of the HOT PON 120. The GPON HOT PON 200 may support up to about 128 HOT PON NTs 330.

The GPON OLT 310 may be a TDM PON OLT that transmits data using the GPON protocol. The GPON may have a substantially larger bandwidth than the EPON. For example, the GPON data may be transmitted at about 2.5 Gbps downstream and 1.25 Gbps upstream. The GPON HOT PON converter 320 may be similar to the EPON HOT PON converter 220. However, the GPON HOT PON converter 320 may handle GPON GEM frames instead of EPON Ethernet frames. The GPON OLT 310 may be located at a central office and the HOT PON converter 320 may be located in the field away from the GPON OLT 310. The fiber 315 between the GPON OLT 310 and the HOT PON converter 320 may not comprise any splitters and hence may reach to about 70 km or more. The GPON NTs 330 may be similar to the EPON NTs 230, but may handle GPON frames instead of EPON frames.

Figure 4:
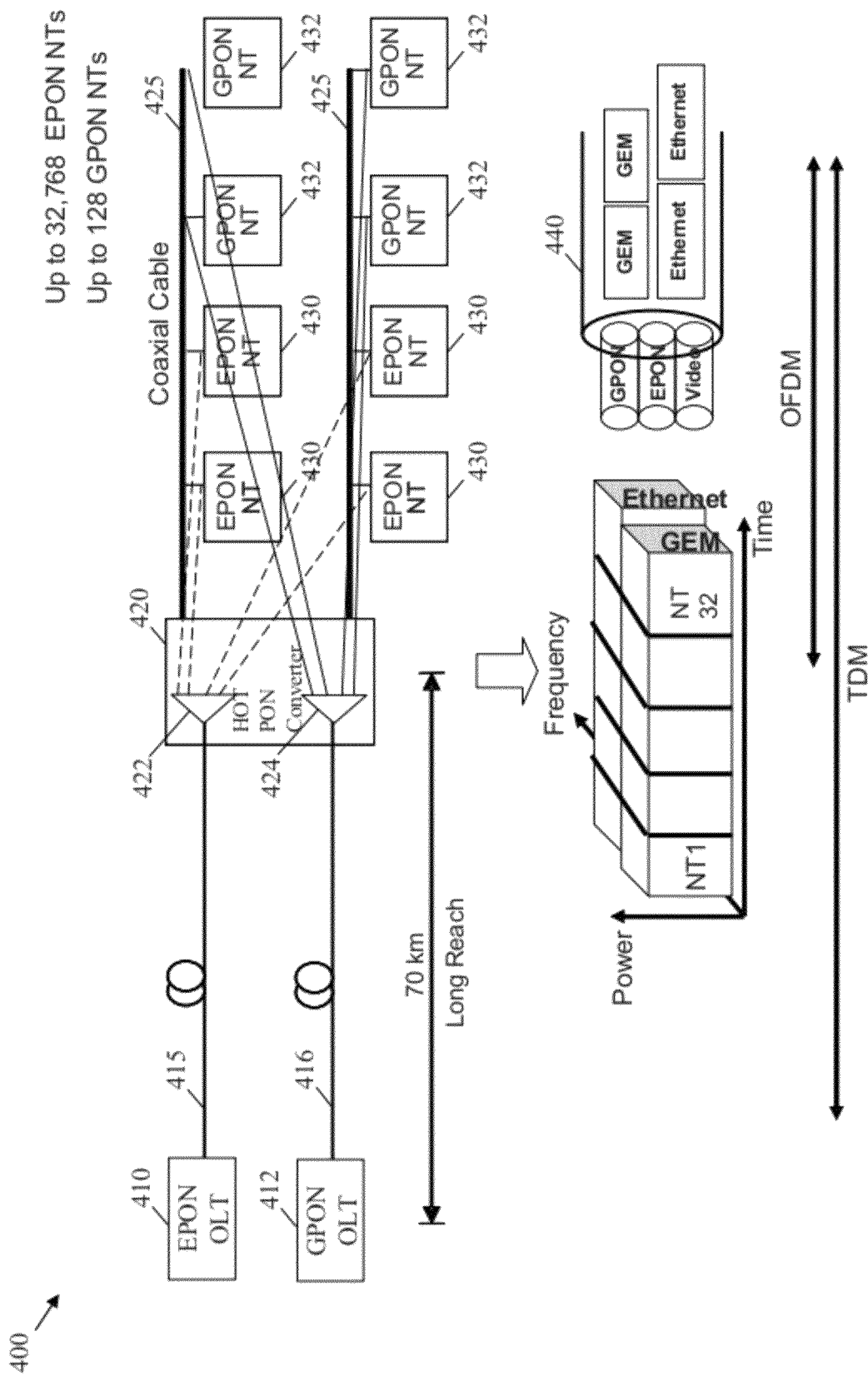
FIG. 4 is a schematic diagram of an embodiment of a combined EPON and GPON based HOT PON.

FIG. 4 illustrates an embodiment of a combined EPON and GPON based HOT PON 400. The combined EPON and GPON HOT PON 400 may comprise both an EPON HOT PON and a GPON HOT PON that may be similar to the HOT PONs above. The EPON HOT PON and GPON HOT PON may share the same coaxial cable but on the different frequency bands. The combined EPON and GPON HOT PON 400 may comprise an EPON OLT 410, a GPON OLT 412, a HOT PON converter 420, a plurality of EPON HOT PON NTs 430, and a plurality of GPON HOT PON NTs 432. Each of the EPON OLT 410 and GPON OLT 412 may be coupled to the HOT PON converter 420 via a corresponding single fiber 415 and 416, respectively. The HOT PON converter 420 may be coupled to a plurality of EPON HOT PON NTs 430 and GPON HOT PON NTs 432 via a plurality of coaxial cables 425. The EPON HOT PON NTs 430 and GPON HOT PON NTs 432 may share the same coaxial cables 425. The components of the combined EPON and GPON HOT PON 400 may be configured similar to the corresponding components of the HOT PON 120. The combined EPON and GPON HOT PON 400 may support up to about 32,768 logical EPON HOT PON NTs 430 and up to about 128 GPON HOT PON NTs 432. In other embodiments, the combined EPON and GPON HOT PON 400 may comprise more EPON OLTs 410 and/or GPON OLTs 412 that may share the HOT PON converter 420 via a plurality of corresponding optical fibers.

In case of migration from HOT PON to FTTH, the HOT PON converter 420 may be replaced by a splitter 422 for the fiber 415 corresponding to the EPON OLT 410 and a splitter 424 for the fiber 416 corresponding to the GPON OLT 412. The splitter 422 may couple the EPON OLT 410 to all the corresponding EPON NTs 430 and the splitter 424 may couple the GPON OLT 412 to all the corresponding GPON NTs 432, e.g., via optical fiber cables. The installed GPON HOT PON NTs and EPON HOT PON NTs may be change to corresponding GPON NTs and EPON NTs by replacing the plug in GPON HOT PON electrical transceivers and EPON HOT PON electrical transceivers with corresponding plug small form-factor pluggable (SFP) GPON transceivers and SFP EPON transceivers, respectively.

The TDM signals may comprise a plurality of different time slots assigned to the different NTs. Each time slot may comprise Ethernet data for a corresponding EPON NT 430 (in the case of the EPON OLT 410) or Gigabit Passive Optical Network Encapsulation Method (GEM) data for a corresponding GPON NT 432 (in the case of the GPON OLT 412). The HOT PON converter 420 may then redistribute the Ethernet and/or GEM frames over a plurality of different frequency channels to the corresponding NTs using OFDM or bounded QAMs. The TDM to OFDM converter 420 may then reuse TDM PONs scheduling protocols in the point-to-multipoint coaxial cable sections instead of designing another scheduling protocol for coaxial cable. The transmitted data may still comprise TDM PON MAC frames that may be processed by the corresponding NTs in a manner similar to a TDM PON, i.e., using the TDM protocol. Additionally, the HOT PON converter 420 may forward video broadcast from the OLTs to the NTs over a dedicated or predetermined frequency channel, e.g., in parallel with the Ethernet and GEM frames.

Figure 5:
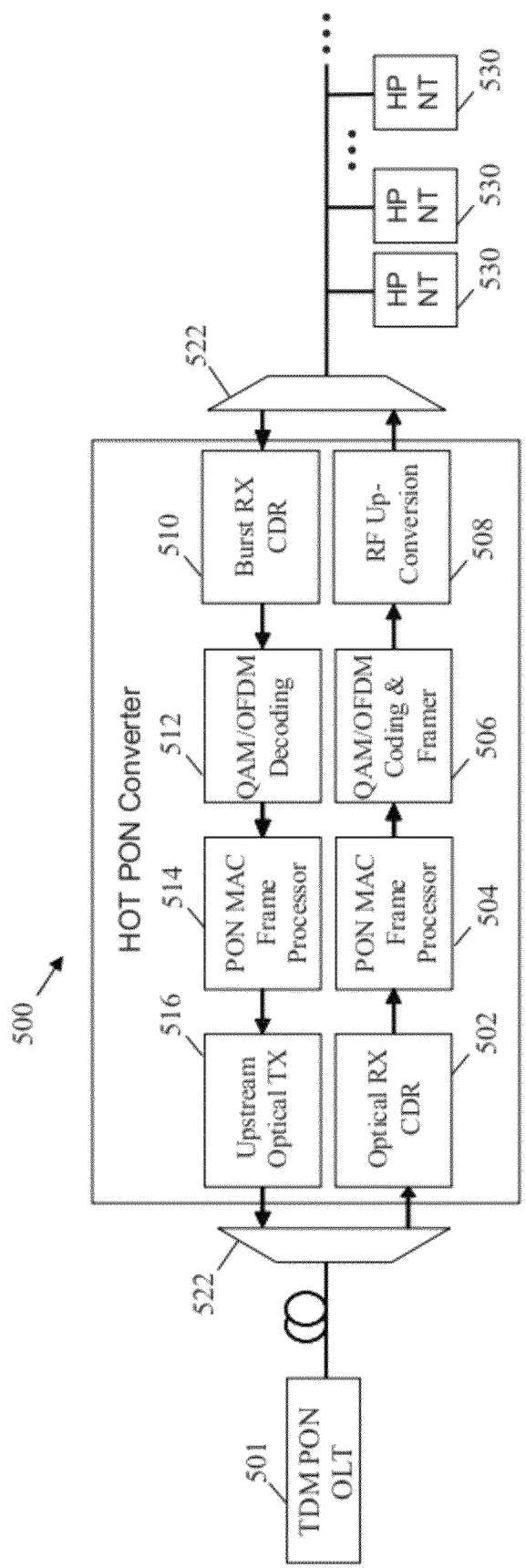
FIG. 5 is a schematic diagram of an embodiment of a HOT PON converter.

FIG. 5 illustrates an embodiment of a HOT PON converter 500 that may be used in the EPON HOT PON 200, GPON HOT PON 300, or combined EPON and GPON HOT PON 400. As such, the HOT PON converter 500 may be coupled to at least one TDM PON OLT 501, via an optical fiber, and to a plurality of HOT PON (HP) NTs 530, via a coaxial cable. The TDM PON OLT 501 may be an EPON OLT and/or a GPON OLT and the HP NTs 530 may be EPON HP NTs and/or GPON HP NTs, as described above.

The HOT PON converter 500 may comprise an downstream optical receiver (RX) and clock and data recovery (CDR) module 502, a PON MAC frame processor 504, a QAM/OFDM coding module and framer 506, and a RF up-conversion module 508, which may be used to convert downstream signals from the TDM PON OLT 501 to the HP NTs 530. The HOT PON converter 500 may also comprise an upstream burst mode receiver and CDR module 510, a QAM/OFDM decoding module 512, a second PON MAC frame processor 514, and an upstream optical transmitter (TX) 516, which may be used to convert upstream signals from the HP NTs 530 to the TDM PON OLT 501. The downstream and upstream signals may be combined/separated by an optical splitter 522 at the optical fiber coupled to the TDM PON OLT 501. The downstream and upstream signals may also be combined/separated by an electrical splitter 532 at the coaxial cable coupled to the HP NTs 530. The components of the HOT PON converter 500 may be implemented using hardware, and in some embodiment also using software.

The downstream optical signals from the TDM PON OLT 501 may be received by the optical RX and CDR module 502 that extract clock information. The extracted TDM data in the signals may then be processed by the PON MAC frame processor 504 in Ethernet (for EPON) or GEM (for GPON) frames. The frames may then be forwarded to the QAM/OFDM coding module and framer 506 to implement the QAM and/or OFDM schemes. The data may then be transmitted by the RF up-conversion module 508 in frequency domain and electrical RF signal formats. The upstream electrical signals from the HP NTs 530 may be received by the burst RX and CDR module 510 that implements CDR. The QAM and OFDM data in the signals may then be processed by the QAM/OFDM decoding module 512 based on the QAM and OFDM schemes. The demodulated data may then be processed to obtain the TDM PON MAC frames by the second PON MAC frame processor 514. The TDM data may then be transmitted as optical signals by the upstream optical TX 516 to the TDM PON OLT 510. The upstream optical TX 516 in HOT PON converter 500 may operate in continuous mode instead of burst mode due to the HOT PON architecture.

Unlike some other systems, where an OLT may be coupled to a plurality of ONUs via a shared optical fiber, only one optical link may be extended between the HOT PON TDM to HOT PON converter 500 and the TDM PON OLT 501 via a corresponding fiber. Thus, the HOT PON converter 500 may not need to operate in a burst mode to send upstream signals, e.g., intermittently, to the TDM PON OLT 501. Instead, the HOT PON converter 500 may be configured to operate at an "ON" state using a continuous transmission mode for upstream signals, which may improve upstream signal quality and reduce errors.

Additionally, the EPON HOT PON 200, GPON HOT PON 300, or combined EPON and GPON HOT PON 400 systems may have only collision domain, i.e., collision in the point-to-multipoint coaxial cable sections. Collisions are not possible in fiber section in HOT PON architecture. Other architectures may have two collision domains, where collisions may occur in the point-to-multipoint optical fiber network and the point-to-multipoint coaxial cable network.

Figure 6:
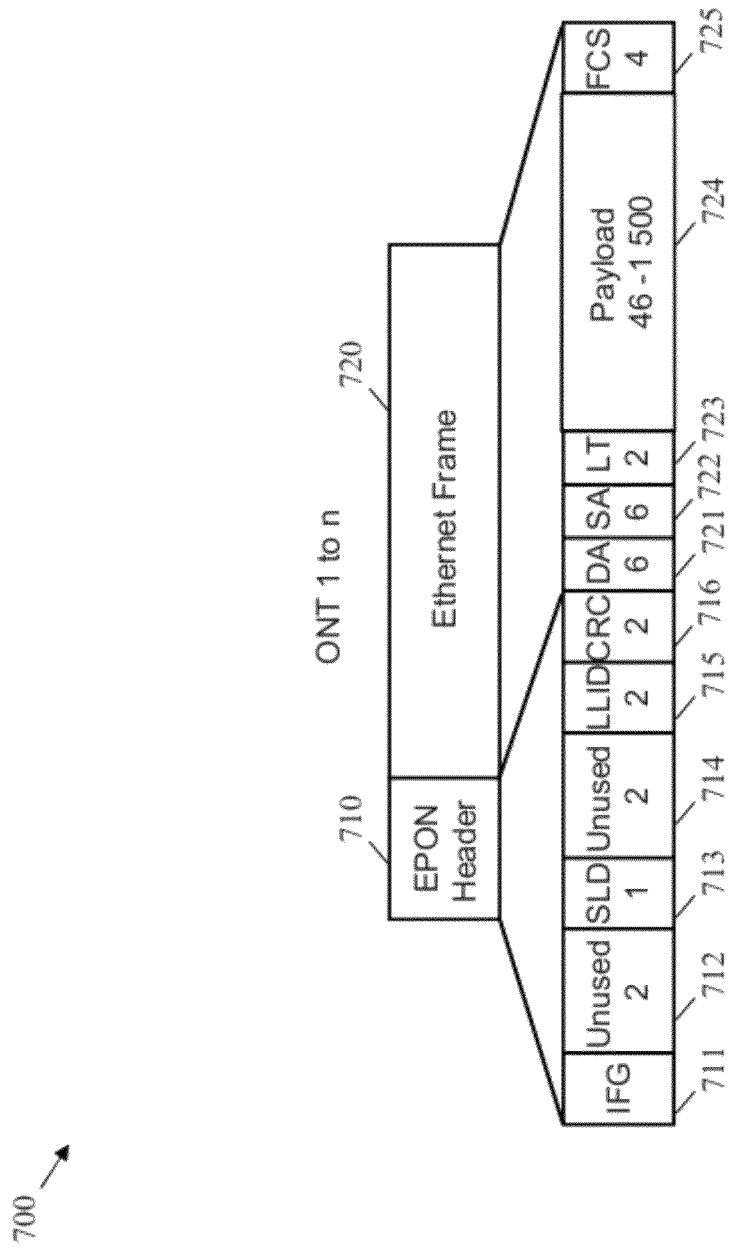
FIG. 6 is a schematic diagram of an embodiment of a HOT PON frame.

FIG. 6 illustrates an embodiment of an EPON HOT PON frame 700 that may be received by a HOT PON converter from an EPON OLT after CDR and removing EPON line code and then encapsulated using the OFDM scheme or bounded QAM channels and sent in the downstream direction. The EPON frame 700 may also be encapsulated by the HOT PON converter and sent to the OLT in the upstream direction. Specifically, the EPON frame 700 may comprise Ethernet data. As such, the EPON frame 700 may comprise an EPON header 710 and an Ethernet frame 720. The EPON header 710 may comprise an Inter-Frame Gap (IFG) 711, an unused field 712 (e.g., comprising about 2 bits), a Start of Logical Link Identifier (LLID) Delimiter (SLD) 713 (e.g., comprising about 1 bit), a second unused field 714 (e.g., comprising about 2 bits), a LLID 715 (e.g., comprising about 2 bits), and a Cyclic Redundancy Check (CRC) 716 (e.g., comprising about 2 bits). The EPON header 710 may also comprise a destination address (DA) 721 (e.g., comprising about 6 bits), a source address (SA) 722 (e.g., comprising about 6 bits), a link trace (LT) 723 (e.g., comprising about 2 bits) a payload 724 (e.g., that may comprise any size from about 46 bits to about 1,500 bits), and a Frame Check Sequence (FCS) 725 (e.g., comprising about 4 bits). The Ethernet frame 720 may comprise Ethernet data that may be assigned to a plurality of NTs using the TDM scheme. For instance, the Ethernet frame 720 may comprise a plurality of subsequent fields or slots, which may correspond to the different NTs. The fields in the EPON header 710 may be typical EPON fields and the fields of the Ethernet frame may be configured based on the EPON TDM protocol.

Figure 7:
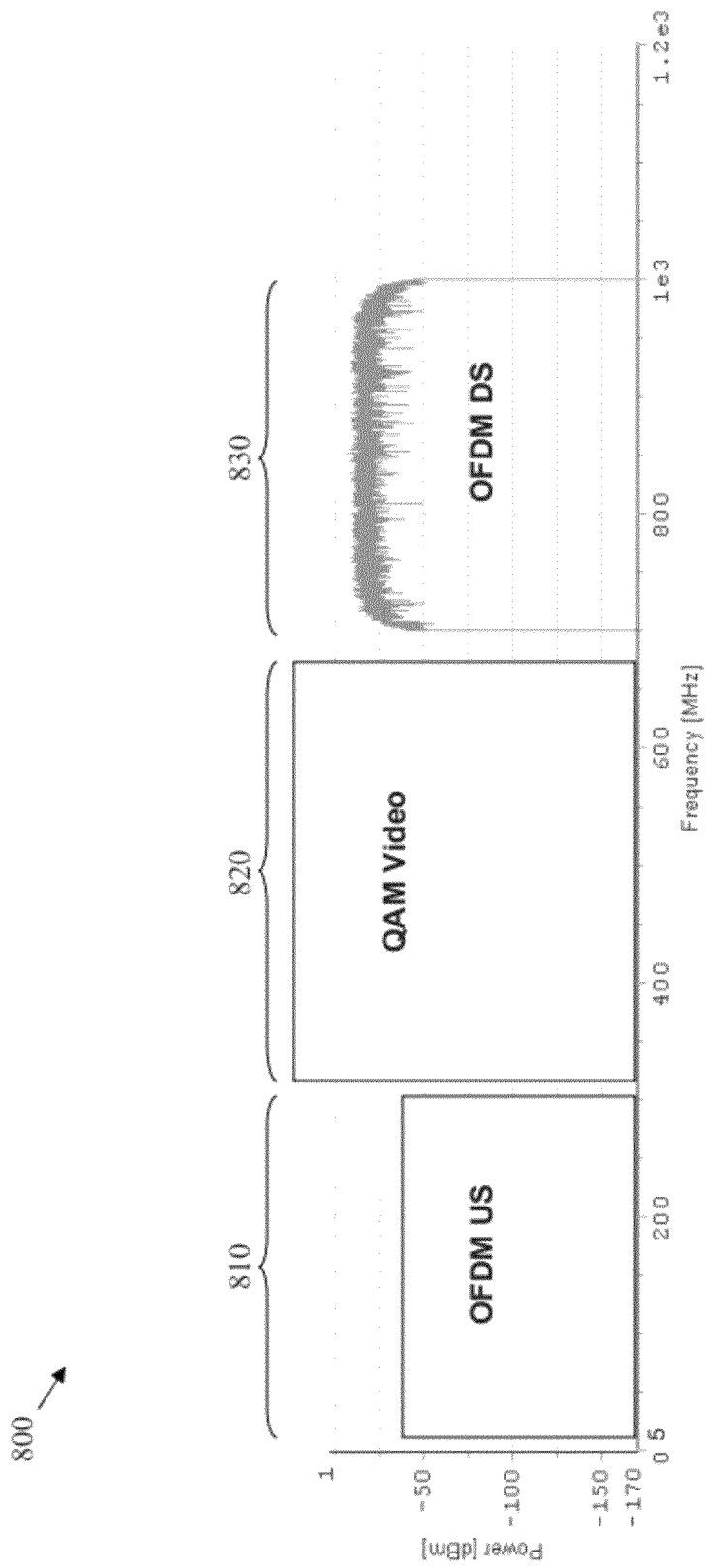
FIG. 7 is a schematic diagram of an embodiment of HOT PON communication channels.

FIG. 7 illustrates an embodiment of multiple HOT PON communication channels 800 that may be supported in the EPON HOT PON 200, GPON HOT PON 300, or combined EPON and GPON HOT PON 400. The HOT PON communication channel 800 may comprise one or more OFDM upstream (US) channels 810 or bounded QAM channels, a video (e.g., QAM video) channel 820, and one or more OFDM downstream (DS) channels 830 or bounded QAM channels. The OFDM or bounded QAM US channels 810 may range from about 5 to about 300 Megahertz (MHz) and may be received by the HOT PON converter from a plurality of NTs. The OFDM or bounded QAM DS channels 830 may range from about 700 to about 1,000 MHz and may be transmitted by the HOT PON converter to the NTs. The video channels 820 may range from about 300 to about 700 MHz and may also be transmitted by the HOT PON converter to the NTs. Band gaps may be maintained between the three channels to avoid cross talk or interference. In some embodiments, the HOT PON converter or the coaxial cable may comprise one or more filters to properly transmit/receive the different channels.

The coaxial cable echo delay is in the order of few microseconds (μs). If OFDM schedule is used, then the OFDM symbol length is required to be sufficiently long so that a cyclic prefix (CP) is longer than echo delay in the cable. The OFDM sub-channel number in the above frequency band may be few thousands, for example about 2,000 OFDM sub-channels. The resulting OFDM frame may be relatively long, e.g., in the order of few hundred μs, which may not be efficient to transmit relatively short EPON frames, e.g., of about 64 bytes minimum in EPON case. If bounded QAM channels are used in HOT PON architecture, substantially shorter frames may be used that may be more efficient to transmit short EPON frames. In the above frequency band, about 20, 128, or 256 channels may be bounded to provide about 1 Gbps bandwidth.

Figure 8:
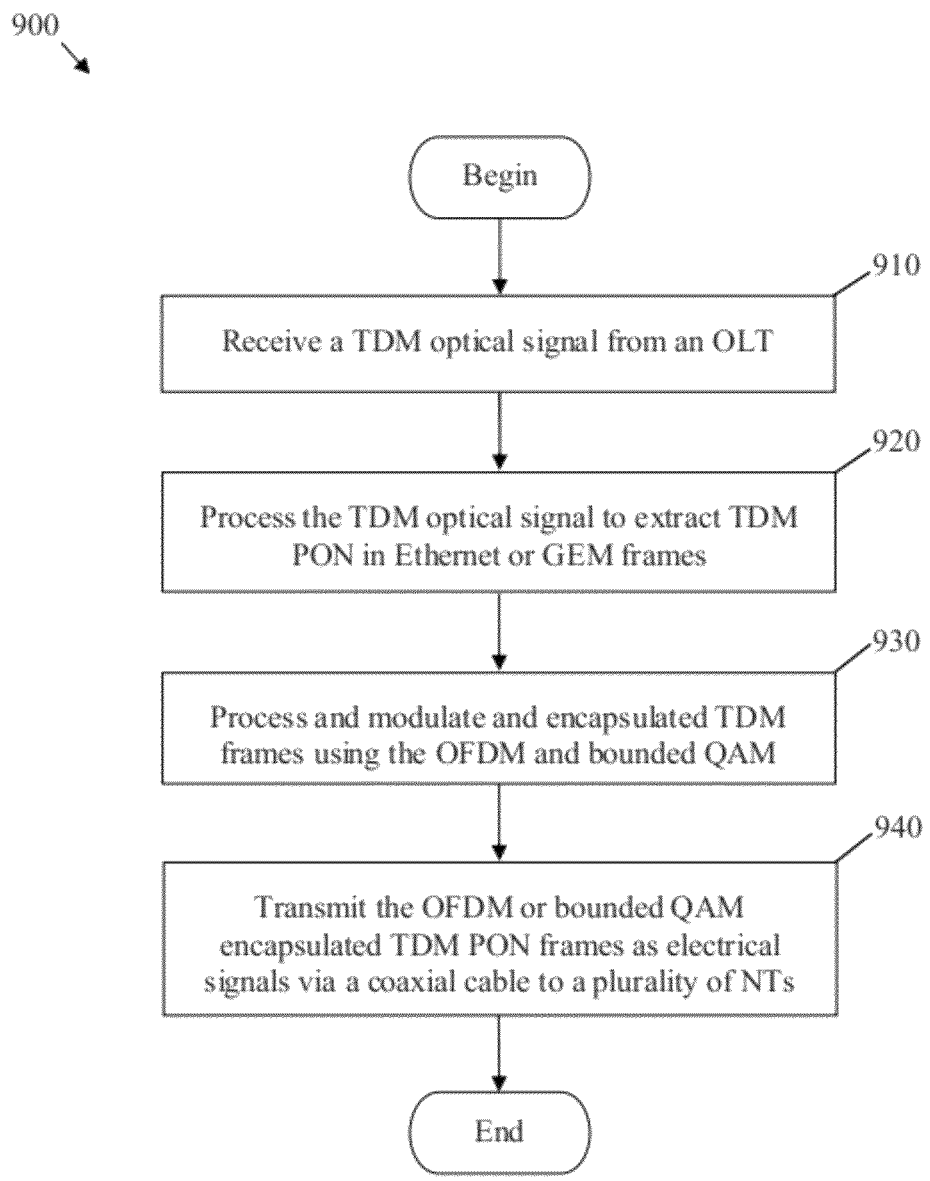
FIG. 8 is a flowchart of an embodiment of a HOT PON data forwarding method.

FIG. 8 illustrates an embodiment of a HOT PON data forwarding method 900, which may be used in a HOT PON PON, such as the EPON HOT PON 200, GPON HOT PON 300, and combined EPON and GPON HOT PON 400. The HOT PON data forwarding method 900 may extend the TDM PON protocols (e.g., for an EPON, GPON, or other PON types) to the coaxial cable plant using the OFDM scheme or bounded QAM channels and may be implemented at a HOT PON converter. The HOT PON data forwarding method 900 may be used to process and forward downstream data from the OLT to the NTs.

The method 900 may begin at block 910, where a TDM optical signal may be received from an OLT (e.g., an EPON or GPON OLT). This may be achieved using the optical RX CDR module 502. At block 920, the TDM optical signal may be processed to extract TDM PON frames (e.g., EPON or GPON TDM) in Ethernet or GEM frames. This may be achieved using the PON MAC frame processor 504. At block 930, the encapsulated TDM frames may be processed, modulated, and encapsulated using the OFDM scheme or bounded QAM. This may be achieved using the QAM/OFDM coding module and framer 506 or the QAM/OFDM coding module 602. At block 940, the OFDM or bounded QAM encapsulated TDM PON frames may be transmitted as electrical signals via a coaxial cable to a plurality of NTs. This may be achieved using the RF up-conversion module 508 or 606. The method 900 may then end. A similar forwarding method may also be implemented by the HOT PON converter to process and forward upstream data from the NTs to the OLT, e.g., using the upstream signal processing components of the HOT PON converter 500. The upstream data forwarding method may comprise the reverse steps of the HOT PON data forwarding method 900.

Figure 9:
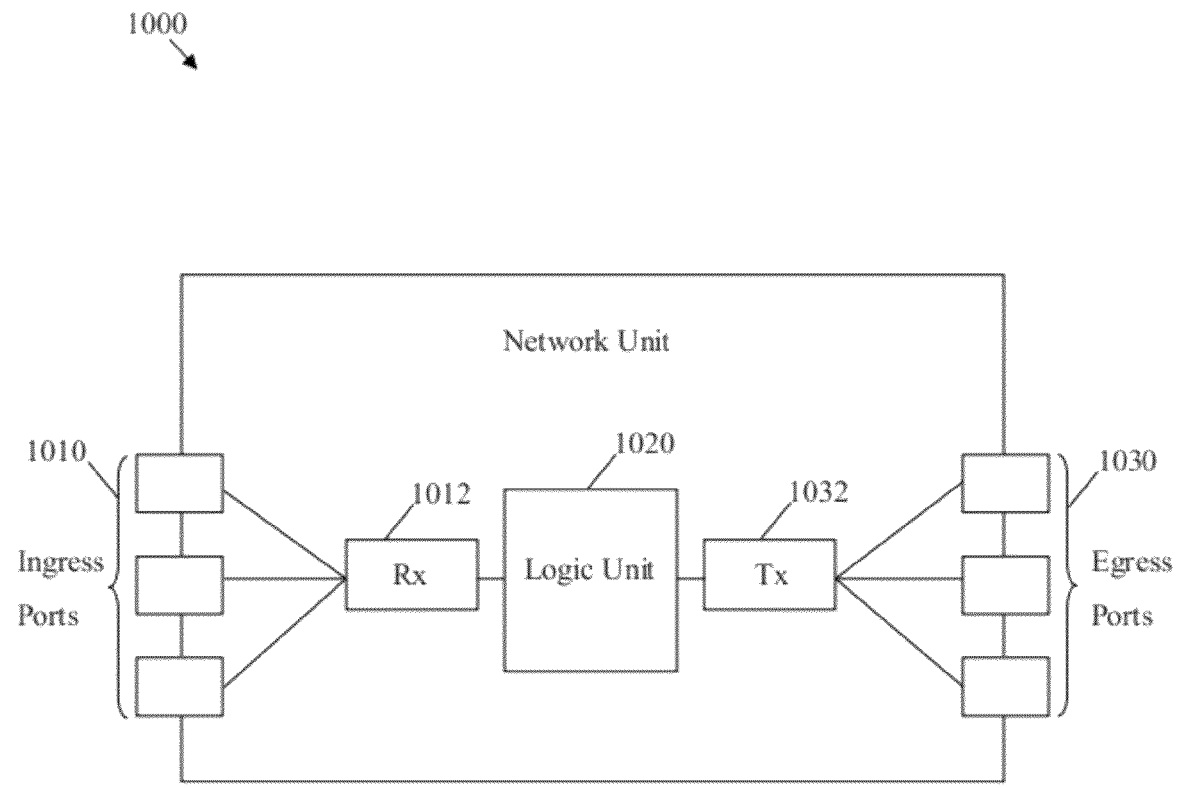
FIG. 9 is a schematic diagram of an embodiment of a network unit.

FIG. 9 illustrates an embodiment of a network unit 1000, which may be any device that transports and processes data through the HOT PON. For instance, the network unit 1000 may be located in any of the network components described above, e.g., at any one of the HOT PON converter, OLT, and NTs. The network unit 1000 may comprise one or more ingress ports or units 1010 coupled to a receiver (Rx) 1012 for receiving signals and frames/data from other network components. The network unit 1000 may comprise a logic unit 1020 to determine which network components to send the packets to. The logic unit 1020 may be implemented using hardware, software, or both. The network unit 1000 may also comprise one or more egress ports or units 1030 coupled to a transmitter (Tx) 1032 for transmitting signals and frames/data to the other network components. The receiver 1012, logic unit 1020, and transmitter 1032 may also implement or support the dynamic configuration and forwarding method 900, and the service reachability forwarding scheme 900 and/or 1000. The components of the network unit 1000 may be arranged as shown in FIG. 9.

Figure 10:
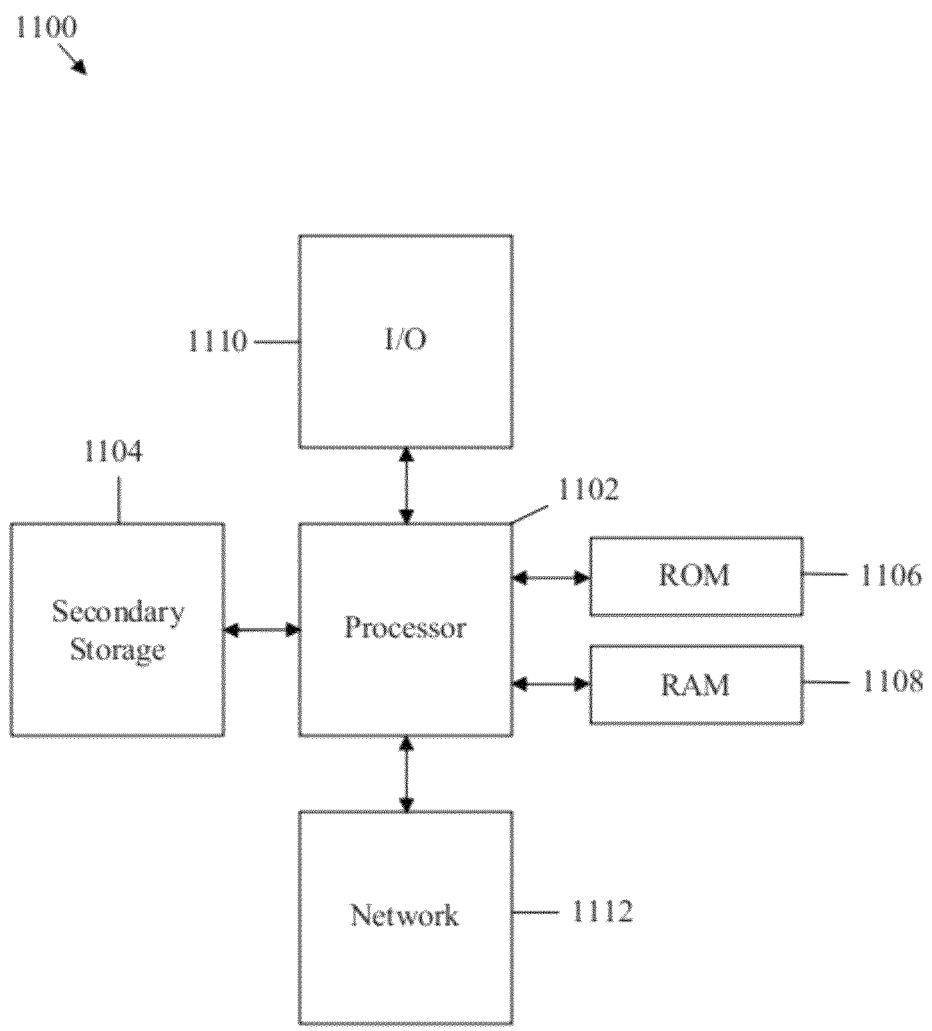
FIG. 10 is a schematic diagram of an embodiment of a general-purpose computer system.

The network components described above may be implemented on any general-purpose network component, such as a computer or network component with sufficient processing power, memory resources, and network throughput capability to handle the necessary workload placed upon it. FIG. 10 illustrates a typical, general-purpose network component 1100 suitable for implementing one or more embodiments of the components disclosed herein. The network component 1100 includes a processor 1102 (which may be referred to as a central processor unit or CPU) that is in communication with memory devices including secondary storage 1104, read only memory (ROM) 1106, random access memory (RAM) 1108, input/output (I/O) devices 1110, and network connectivity devices 1112. The processor 1102 may be implemented as one or more CPU chips, or may be part of one or more application specific integrated circuits (ASICs).

The secondary storage 1104 is typically comprised of one or more disk drives or tape drives and is used for non-volatile storage of data and as an over-flow data storage device if RAM 1108 is not large enough to hold all working data.

Secondary storage 1104 may be used to store programs that are loaded into RAM 1108 when such programs are selected for execution. The ROM 1106 is used to store instructions and perhaps data that are read during program execution. ROM 1106 is a non-volatile memory device that typically has a small memory capacity relative to the larger memory capacity of secondary storage 1104. The RAM 1108 is used to store volatile data and perhaps to store instructions. Access to both ROM 1106 and RAM 1108 is typically faster than to secondary storage 1104.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus comprising:
a time domain multiplexing (TDM) to Orthogonal Frequency Division Multiplexing (OFDM) or bounded Quadrature Amplitude Modulation (QAM) channels HOT passive optical network (PON) converter configured to couple to an optical line terminal (OLT) via an optical fiber and to a plurality of network terminals (NTs) via a point-to-multipoint coaxial cable and configured to transmit TDM data from the OLT using OFDM or bounded QAM channels to the corresponding NTs,
wherein the OFDM or bounded QAM channels transmission of TDM data maintains End-to-End (E2E) TDM PON protocols, service provisioning, and quality of service (QoS), and
wherein the HOT PON converter comprises a QAM/OFDM coding module and framer for converting downstream signals from the OLT to the NTs.

2. The apparatus of claim 1, wherein the optical fiber does not comprise a splitter and has at least 70 kilometers reach.

3. The apparatus of claim 1, wherein the OLT and NTs exchange a plurality of Ethernet PON (EPON) frames, and wherein the EPON frames are transported between the OLT and the HOT PON converter using TDM and between the HOT PON converter and the NTs using OFDM or bounded QAM channels.

4. The apparatus of claim 1, wherein the OLT and NTs exchange a plurality of Gigabit PON (GPON) Encapsulation Method (GEM) frames, and wherein the GEM frames are transported between the OLT and the HOT PON converter using TDM and between the HOT PON converter and the NTs using OFDM or bounded QAM channels.

5. The apparatus of claim 1, wherein the HOT PON converter comprises a first splitter for coupling an Ethernet PON (EPON) OLT to a plurality of EPON NTs that exchange EPON frames and a second splitter for coupling a Gigabit PON (GPON) OLT to a plurality of GPON NTs that exchange Gigabit PON (GPON) Encapsulation Method (GEM) frames.

6. The apparatus of claim 1, wherein the HOT PON converter further comprises an optical receiver and data recovery (CDR) module, a first TDM PON Media Access Control (MAC) frame processor, and a radio frequency (RF) up-conversion module for converting downstream signals from the OLT to the NTs, and wherein the HOT PON converter further comprises a burst receiver and CDR module, a QAM/OFDM decoding module, a second TDM PON MAC frame processor, and an upstream optical transmitter for converting upstream signals from the NTs to the OLT.

7. A network component comprising:
a receiver configured to receive time domain multiplexing (TDM) passive optical network (PON) downstream data from an optical line terminal (OLT) and receive Orthogonal Frequency Division Multiplexing (OFDM) or bounded Quadrature Amplitude Modulation (QAM) upstream data from a plurality of network terminal (NTs);
a converter configured to remove TDM PON line coding and to encapsulate and convert the TDM PON downstream frames to OFDM or bounded QAMs downstream data and encapsulate and convert the OFDM or bounded QAMs upstream data to TDM PON upstream frames, wherein the converter comprises a QAM/OFDM coding module and framer; and a radio frequency (RF) transmitter configured to send the OFDM or bounded QAMs downstream data to the corresponding NTs and an optical transmitter to send the TDM PON upstream data to the OLT.

8. The network component of claim 7, wherein the optical transmitter is further configured to operate using a continuous transmission mode for upstream signals.

9. A network component comprising:

a receiver configured to receive time domain multiplexing (TDM) passive optical network (PON) downstream data from an optical line terminal (OLT) and receive Orthogonal Frequency Division Multiplexing (OFDM) or bounded Quadrature Amplitude Modulation (QAM) upstream data from a plurality of network terminal (NTs);

a converter configured to remove TDM PON line coding and to encapsulate and convert the TDM PON downstream frames to OFDM or bounded QAMs downstream data and encapsulate and convert the OFDM or bounded QAMs upstream data to TDM PON upstream frames; and a radio frequency (RF) transmitter configured to send the OFDM or bounded QAMs downstream data to the corresponding NTs and an optical transmitter to send the TDM PON upstream data to the OLT, wherein the TDM PON downstream data and similarly the TDM PON upstream data comprise an Ethernet PON (EPON) frame that comprises an EPON header and an Ethernet frame, wherein the EPON header comprises an Inter-Frame Gap (IFG), an unused field, a Start of Logical Link Identifier (LLID) Delimiter (SLD), a second unused field, a LLID, a Cyclic Redundancy Check (CRC), a destination address (DA), a source address (SA), a link trace (LT), a payload, and a Frame Check Sequence (FCS), and wherein the Ethernet frame comprises a plurality of subsequent fields or slots that correspond to the different NTs.

10. The network component of claim 7, wherein the OFDM or bounded QAMs downstream data and similarly the OFDM or bounded QAMs upstream data comprise TDM PON Media Access Control (MAC) frames that include at least one of an Ethernet frame and/or a Gigabit Passive Optical Network Encapsulation Method (GEM) frame.

11. The network component of claim 7, wherein the OFDM or bounded QAM downstream data is transmitted over an OFDM or bounded QAM downstream channels that ranges from about 700 Megahertz (MHz) to about 1,000 MHz, and wherein the OFDM or bounded QAM upstream data is transmitted over an OFDM or bounded QAM upstream channels that ranges from about 5 MHz to about 300 MHz.

12. The network component of claim 7, wherein the transmitter is further configured to transmit video broadcast data to the NTs, and wherein the video broadcast data is modulated using QAM.

13. The network component of claim 12, wherein the video broadcast data is transmitted over a QAM video channel that ranges from about 300 Megahertz (MHz) to about 700 MHz.

14. The network component of claim 7, wherein the NTs comprise up to about 32,768 logical Ethernet PON (EPON) HOT PON NTs.

15. The network component of claim 7, wherein the NTs comprise up to about 128 Gigabit PON (GPON) HOT PON NTs.

16. A network apparatus implemented method comprising:

receiving a time domain multiplexing (TDM) optical signal from an optical line terminal (OLT);

processing with a processor the TDM optical signal to remove TDM Passive Optical Network (PON) line code and to extract TDM data in a TDM PON frame;

processing, with a quadrature amplitude modulation (QAM)/orthogonal frequency division multiplexing (OFDM) coding and framer module located in a HOT passive optical network (PON) converter, to encapsulate the TDM PON frame using OFDM or bounded QAM; and sending the OFDM or bounded QAM processed TDM PON frame to a plurality of network terminals (NTs) via a coaxial cable.

17. The network apparatus implemented method of claim 16, wherein the received TDM PON optical signal is processed for clock and data recovery (CDR) and to extract PON Media Access Control (MAC) frame.

18. The network apparatus implemented method of claim 16, wherein the encapsulated TDM PON frame is modulated using OFDM and/or bounded Quadrature Amplitude Modulation (QAM).

19. The network apparatus implemented method of claim 16 further comprising:

receiving an OFDM or QAM electrical signal from the NTs;

processing the OFDM or QAM electrical signal to obtain a TDM passive optical network (PON) frame; and sending the TDM PON frame using an optical signal to the OLT via a point-to-point fiber link, wherein the optical signal is transmitted using a continuous mode upstream optical transmitter.

20. The network apparatus implemented method of claim 19, wherein the received OFDM or QAM electrical signal is demodulated and processed for clock and data recovery (CDR) and to extract the TDM PON frame.

* * * * *